(12) United States Patent
Fritz et al.

(10) Patent No.: US 9,425,447 B2
(45) Date of Patent: Aug. 23, 2016

(54) MOTOR VEHICLE BATTERY

(71) Applicants: Dr. Ing. h.c. F. Porsche Aktiengesellschaft, Stuttgart (DE); Samsung SDI Co., Ltd., Yongin-si, Gyeonggi-do (KR); Robert Bosch GmbH, Stuttgart (DE)

(72) Inventors: Thomas Fritz, Leochgau (DE); Alexander Klausmann, Shoenaich (DE); Klaus Wipfler, Niefern-Oeschelbronn (DE); Claus Gerald Pflueger, Markgroeningen (DE)

(73) Assignees: Dr. Ing. h.c.F. Porsche Aktiengesellschaft, Stuttgart (DE); Robert Bosch GmbH, Stuttgart (DE); Samsung SDI Co., Ltd., Yongin-si (KR)

( * ) Notice: Subject to any disclaimer, the term of this patent is extended or adjusted under 35 U.S.C. 154(b) by 425 days.

(21) Appl. No.: 13/960,904

(22) Filed: Aug. 7, 2013

(65) Prior Publication Data

US 2014/0045007 A1 Feb. 13, 2014

(30) Foreign Application Priority Data

Aug. 10, 2012 (DE) .......................... 10 2012 015 816

(51) Int. Cl.
*H01M 2/00* (2006.01)
*H01M 2/12* (2006.01)

(52) U.S. Cl.
CPC ......... *H01M 2/1229* (2013.01); *H01M 2/1241* (2013.01); *H01M 2/1252* (2013.01); *H01M 2220/20* (2013.01)

(58) Field of Classification Search
CPC .................. H01M 2/1229; H01M 2/1241
USPC ............................................. 429/82
See application file for complete search history.

(56) References Cited

U.S. PATENT DOCUMENTS

| 7,713,651 | B2 | 5/2010 | Leysieffer et al. | |
| 2007/0111089 | A1* | 5/2007 | Swan | H01M 2/024 429/160 |
| 2013/0236754 | A1* | 9/2013 | Lim | H01M 2/12 429/82 |

FOREIGN PATENT DOCUMENTS

| EP | 1 073 132 | 1/2001 |
| EP | 2 273 587 | 1/2011 |

OTHER PUBLICATIONS

German Search Report of Mar. 4, 2013.

*Primary Examiner* — Mark F Huff
*Assistant Examiner* — Monique Wills
(74) *Attorney, Agent, or Firm* — Gerald E. Hespos; Michael J. Porco; Matthew T. Hespos

(57) ABSTRACT

A motor vehicle battery has at least one battery module with a plurality of battery cells (11) that have connection poles and degassing predetermined breaking points (14). The battery module also has a common battery module control device (19) for all of the battery cells (11) of the battery module. The degassing predetermined breaking points (14) of the battery cells (11) are on one side of the battery module and are offset inward in relation to the connection poles of the battery cells to form a recess (15). A guide element (16) is positioned in the recess (15) and extends along all of the battery cells (11) of the respective battery module to define a degassing channel (17) on one side and defining an accommodation space (18) for the battery module control device (19) on the other side.

9 Claims, 4 Drawing Sheets

MOTOR VEHICLE BATTERY

CROSS REFERENCE TO RELATED APPLICATIONS

This application claims priority under 35 USC 119 to German Patent Appl. No. 10 2012 015 816.5 filed on Aug. 10, 2012, the entire disclosure of which is incorporated herein by reference.

BACKGROUND

1. Field of the Invention

The invention relates to a motor vehicle battery.

2. Description of the Related Art

Motor vehicle batteries that are used as energy stores or traction batteries in hybrid vehicles or electric vehicles typically have a plurality of battery modules, and each battery module has a plurality of battery cells with connection poles and predetermined degassing breaking points. The connection poles of the battery cells are used for electrically connecting the battery cells to battery modules and for electrically connecting the battery modules to the motor vehicle battery. The predetermined degassing breaking points are used to degas a battery cell in the event of a fault in or damage to the battery cell.

Each battery module of a motor vehicle battery has a common battery module control device for all of the battery cells of the battery module to control or regulate the charging and discharging of the battery cells.

The predetermined degassing breaking points interact with degassing channels that require installation space. The battery module control devices also require installation space. As a result, it has been difficult to provide compact traction batteries or motor vehicle batteries of this kind.

The object of the invention is to provide a novel motor vehicle battery.

SUMMARY OF THE INVENTION

The invention relates to a battery with predetermined degassing breaking points of the battery cells on one side of each battery module offset toward the inside in relation to the connection poles of the battery cells to form a recess. A guide element extends along all of the battery cells of the respective battery module and is positioned in the recess. The guide element defines a degassing channel and an accommodation space for the battery module control device. Thus, the invention provides a particularly compact design for battery modules of a motor vehicle battery, and therefore a compact design of a motor vehicle battery.

The degassing channel and the accommodation space that are defined by the guide element preferably extend over all of the battery cells of the respective battery module. Accordingly, the motor vehicle battery can be particularly compact and can be installed in a space-saving manner.

The battery cells of each battery module preferably are arranged one behind the other or next to one another to form a stack with the connection poles of the battery cells arranged along parallel pole rows, and the degassing breaking points of the battery cells arranged between these pole rows along a predetermined breaking point row that runs parallel to the pole rows. This arrangement of the battery cells of the battery module ensures a compact design of the motor vehicle battery.

The guide element preferably has a main body that is tub-like in cross section or a main body that is U-shaped in cross section to define a base wall and side edges. Cutouts are made in the base wall, and a profile is fit to the base wall on a side averted from the battery cells or to the side edges to form the degassing channel. Gas can escape from the battery cells via the degassing breaking points in the event of damage to one or more battery cells of the battery module. The gas can be routed into the degassing channel defined by the base wall and the profile via the cutouts in the base wall. The guide element provides a simple and advantageous installation-space-optimized provision of the degassing channel and the accommodation space of the battery module control device.

Exemplary embodiments of the invention will be explained in greater detail with reference to the drawing, without being restricted to this.

DETAILED DESCRIPTION OF THE PREFERRED EMBODIMENTS

The invention relates to a motor vehicle battery that is used as a traction battery or as an electrical energy store in a hybrid vehicle or electric vehicle. The motor vehicle battery can be discharged to a great extent when an electrical machine of the motor vehicle is operated in motor mode, and can be charged to a great extent when said electrical machine is operated in generator mode.

Figure 1:
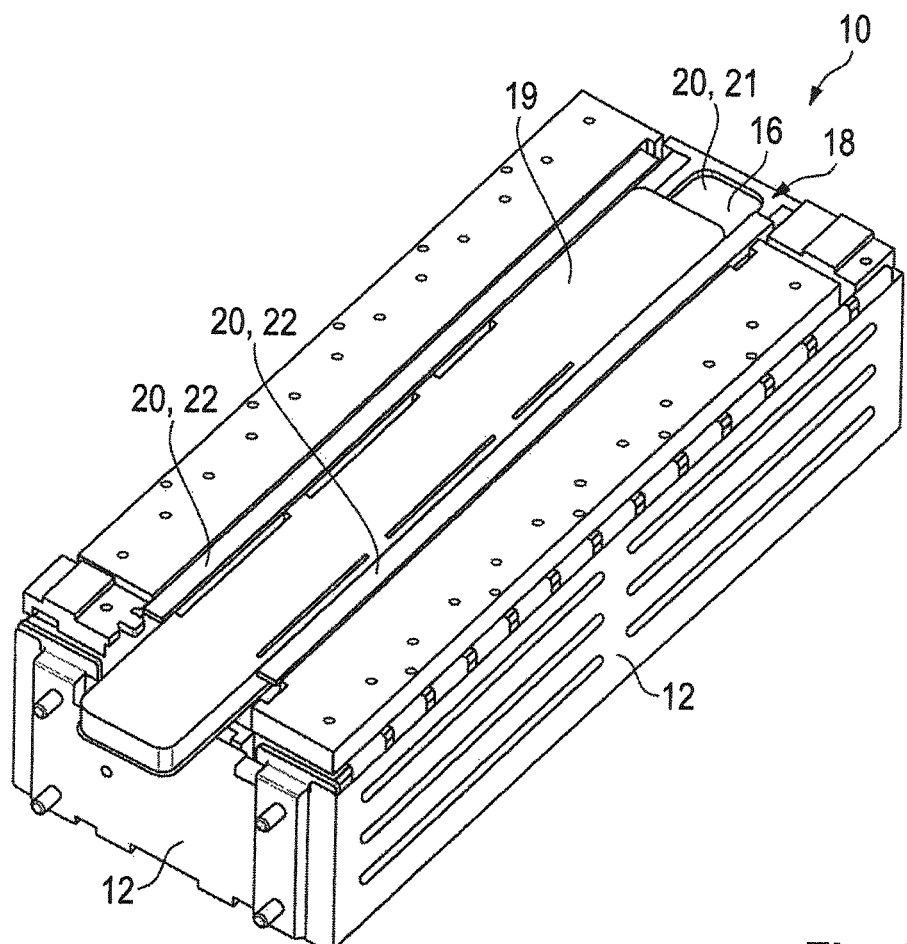
FIG. 1 is a perspective view of a battery module of a motor vehicle battery according to the invention.
Figure 2:
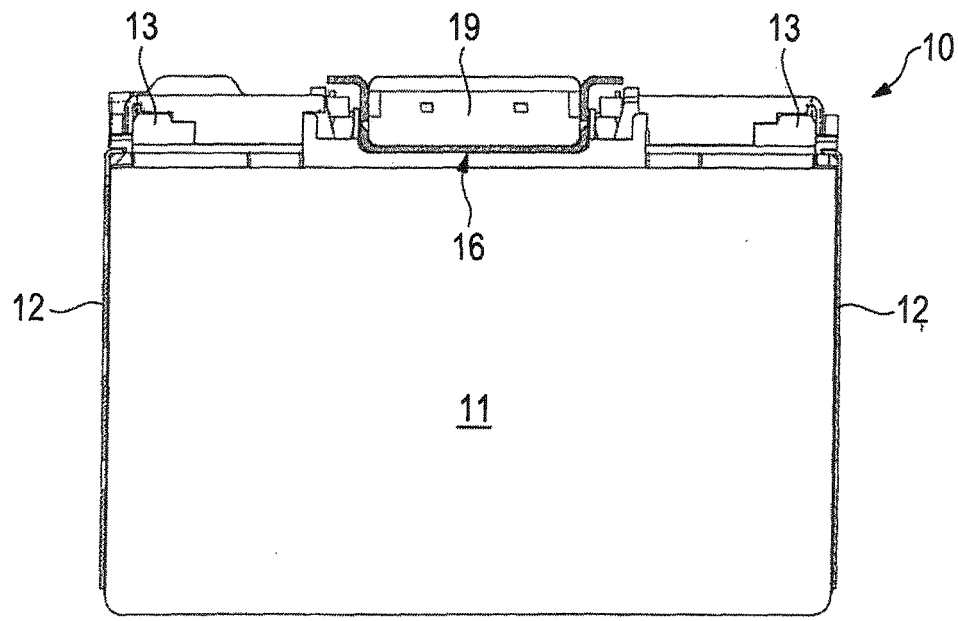
FIG. 2 is a side view of the battery module of FIG. 1.
Figure 3:
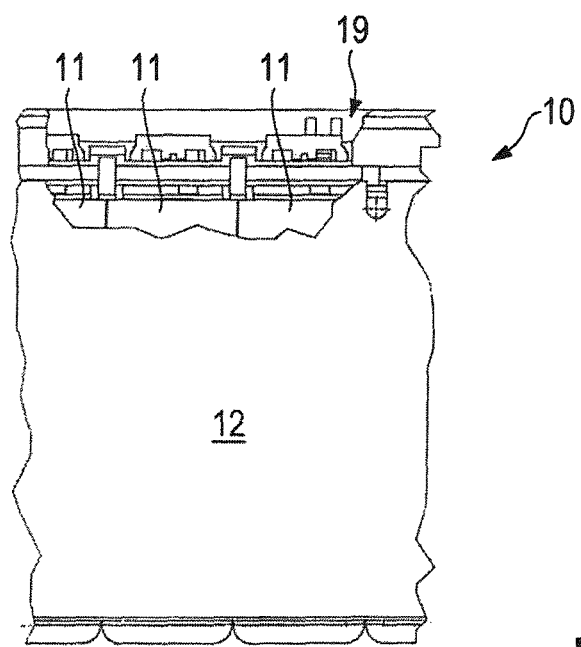
FIG. 3 is a detail of a view of the battery module rotated through 90° in relation to FIG. 2.

The motor vehicle battery has a plurality of battery modules 10 and each battery module 10 has a plurality of battery cells 11 arranged one behind the other or next to one another in the form of a stack, as shown in FIGS. 1 to 3. Module walls 12 of the battery module 10 are parallel to side walls of a stack of battery cells 11. Therefore, the module walls delimit the battery cells 11 and the battery module 10 on the side walls of the battery module 10.

Each battery cell 11 of the battery module 10 has connection poles 13 and a degassing predetermined breaking point 14. The connection poles 13 are used to connect the individual battery cells 11 electrically to the battery module 10 and to connect the battery module 10 electrically to the motor vehicle battery.

Figure 4:
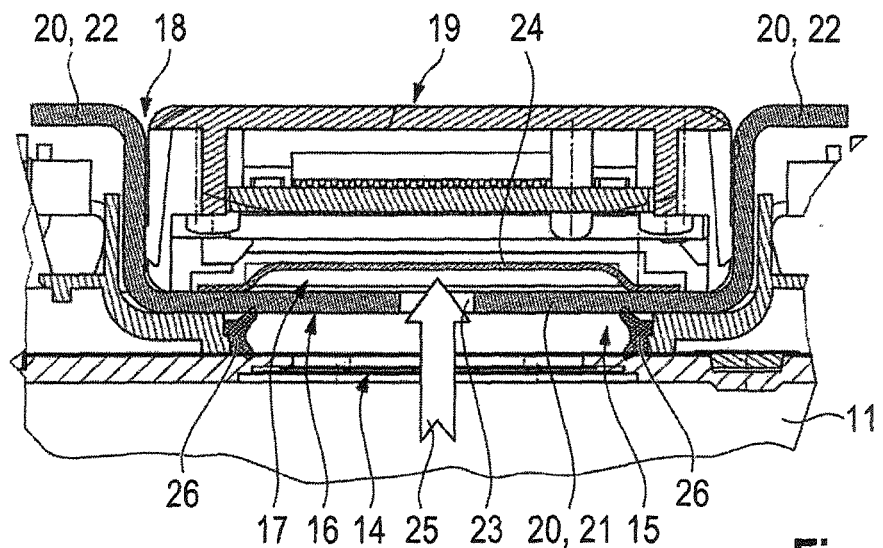
FIG. 4 is a cross section through a detail of the battery module.
Figure 5:
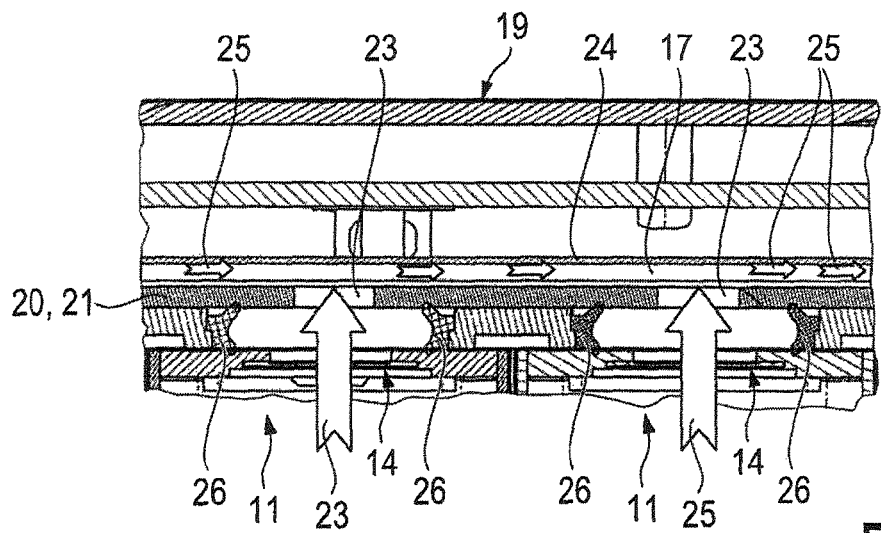
FIG. 5 is the detail of FIG. 4 is rotated through 90° in relation to FIG. 4.

The degassing breaking points 14 preferably are formed by film- or foil-like or sheet-like covers of an opening in a wall of the respective battery cell 11 and are closed when a battery cell 11 is functional. However, the degassing breaking points 14 are opened in the event of a fault in or damage to a battery cell 11 due to an overpressure in the battery cell so that the respective battery cell 11 of the battery module 10 can be degassed through the respective opened degassing breaking point 14. The degassing predetermined breaking points 14 are shown in FIGS. 4 and 5.

The battery cells 11 of each battery module 10 preferably are arranged one behind the other or next to one another in the form of a stack so that the connection poles 13 of the battery cells 11 of the respective battery module 10 are arranged along two parallel pole rows, and the degassing breaking points 14 of the battery cells 11 of the respective battery module 10 are arranged between these pole rows along a predetermined breaking point row that runs parallel to the pole rows.

The connection poles 13 and degassing predetermined breaking points 14 of the battery cells 11 of the respective battery module 10 are on one side, in particular the upper side, of the battery cells 11 of the respective battery module 10. The degassing breaking points 14 of the battery cells 11 are offset toward the inside in relation to the connection poles 13 of the battery cells to form a recess 15.

A guide element 16 extends along all of the battery cells 11 of the respective battery module 10 and is positioned in the recess 15. The guide element defines a degassing channel 17 and also an accommodation space 18 for a battery module control device 19 of the respective battery module 10.

Accordingly, the guide element 16 has two functions, specifically providing a degassing channel 17 that communicates with the degassing breaking points 14 for degassing in the event of damage and also accommodating the battery module control device 19 in the accommodation space 18 to ensure a particularly compact design.

The degassing channel 17 and the accommodation space 18 extend over all of the battery cells 11 of the respective battery module 10.

The guide element 16 has a main body 20 with a U-shaped in cross section defined by a base wall 21 and side edges 22. The side edges 22 extend in the longitudinal direction of the stack of battery cells 11, so that, according to FIG. 1, the battery module control device 19 can be moved out of or into the accommodation space 18, parallel to the longitudinal direction of the stack.

Cutouts 23 are made in the base wall 21 of the main body 20 of the guide element 16. A profile 24 is mounted on a side of the base wall 21 that is averted from the battery cells 11, and defines the degassing channel 17 together with the base wall 21 on that side of the base wall 21 that is averted from the battery cells 21. Gas escapes from the battery cells 11 via the predetermined degassing breaking points 14 when the degassing breaking points 14 are opened in the event of damage to one or more battery cells 11 of the respective battery module 10. The gas then can enter the degassing channel 17 via the cutouts 23 in the base wall 21 of the guide element 16 and can be discharged from the battery module 10 via the degassing channel 17.

FIGS. 4 and 5 show the direction of flow of gas escaping from the battery cells 11 using arrows 25.

The profile can also engage on or be attached to the side edges 22 of the main body 20 on the side of the base wall 21 that is averted from the battery cells 11.

As can be seen in FIGS. 4 and 5, sealing elements 26 seal off the base wall 21 of the main body 20 of the guide element 16 from the battery cells 11 in the region of the degassing breaking points 14. Thus, all of the gas escaping from a battery cell 11 in the event of a fault in or damage to the battery cell flows into the degassing channel 17 via the cutouts 23.

The battery module control device 19 is arranged in the accommodation space 18 defined by the profile 24, the base wall 21 of the main body 20 and the side walls 22 of the main body 20 so that an upper edge of the battery module control device 19 is aligned with an upper edge of the battery cells 11. Accordingly, the battery module control device 19 is integrated fully in the contour of the battery cells 11 and the battery module 10. Therefore, the battery module control device 19 does not project in relation to the battery cells 11. As a result, a particularly space-saving integration of the battery module control device 19 in the battery module 10 and therefore in the motor vehicle battery is possible.

Figure 6:
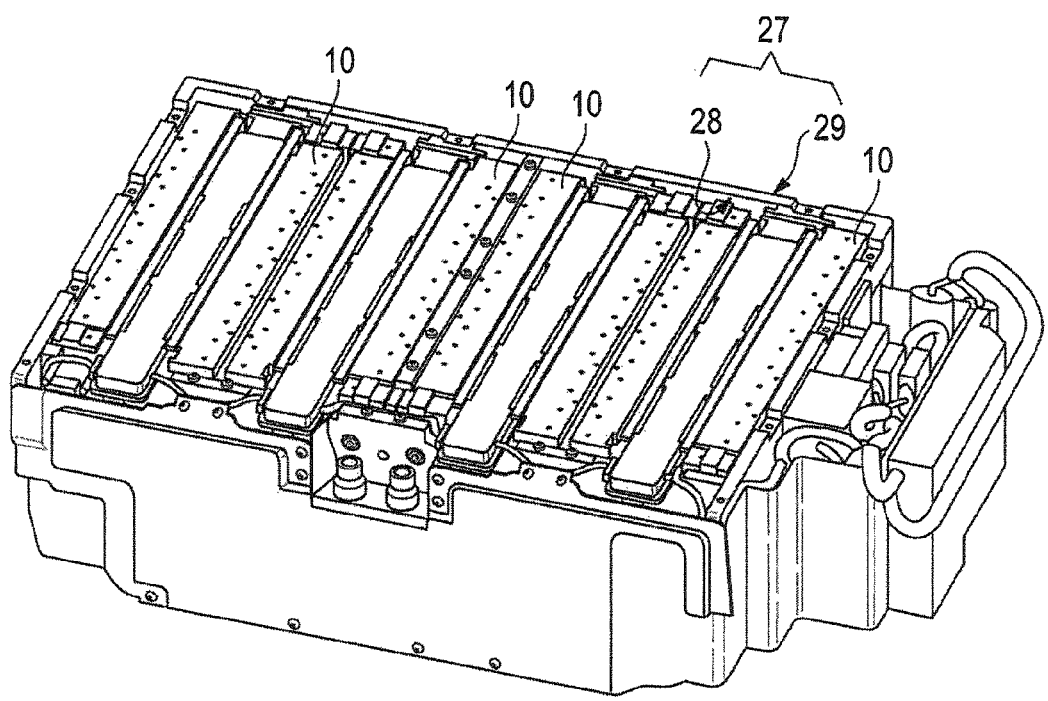
FIG. 6 is a perspective view of a motor vehicle battery.

FIG. 6 is a perspective view of a partly open motor vehicle battery. The motor vehicle battery has a housing 27 that contains a plurality of battery modules 10, specifically two layers of four battery modules 10, with the layers positioned one above the other in the exemplary embodiment shown. Each battery module 10 has a large number of individual battery cells 11. The two layers of battery modules 10 are accommodated in the battery housing 27, which is formed by an internal housing 28 and an external housing 29. The external housing 29 may, if appropriate, be dispensed with, so that the housing 27 then is formed solely by the internal housing 28. The individual battery modules 10 of the motor vehicle battery are attached to housing walls of the internal housing 28 of the battery housing 27. The housing walls to which the individual battery modules 10 are attached extend preferably transverse to the longitudinal direction of a motor vehicle when the motor vehicle battery is mounted. Further housing walls extend in the longitudinal direction of the motor vehicle to define the internal housing 28 of the battery housing, together with the housing walls.

What is claimed is:

1. A motor vehicle battery, comprising:
   at least one battery module having a plurality of battery cells arranged side-by-side, each of the plurality of battery cells having first and second connection poles spaced from one another on a common surface of the at least one battery module and a degassing predetermined breaking point offset inward in relation to the connection poles of the battery cells to form a recess, the recesses of each of the plurality of battery cells aligned with each other to define a continuous recess;
   a guide element positioned in the continuous recess and extending along the plurality of battery cells of the at least one battery module, the guide element having a main body with a U-shaped cross-section defined by a base wall and opposed side walls, cutouts formed through the base wall and communicating with the degassing predetermined breaking points;
   a profile fitted to a side of the guide element opposite the plurality of battery cells, a degassing channel defined between the profile and the guide element and control device accommodation space on a side of the profile opposite the degassing channel; and
   a common battery module control device configured to control the plurality of battery cells of the at least one battery module arranged in the accommodation space so that an outer surface of the common battery module control device does not project beyond the common surfaces of the plurality of battery cells, wherein
   gas escaping from the battery cells via the degassing predetermined breaking points is routed into the degassing channel via the cutouts in the base wall.

2. The motor vehicle battery of claim 1, wherein the degassing channel and the accommodation space extend over all of the battery cells of the battery module.

3. The motor vehicle battery of claim 1, wherein the battery cells of the battery module are arranged one behind the other or next to one another to define a stack with the connection poles of the battery cells being arranged along parallel pole rows, and the degassing predetermined breaking points of the battery cells being arranged between the pole rows along a predetermined breaking point row that is parallel to the pole rows.

4. The motor vehicle battery of claim 1, wherein the motor vehicle battery is a traction battery of a hybrid vehicle or electric vehicle.

5. A motor vehicle battery, comprising:
- at least one battery module having a plurality of battery cells arranged in a stacked array;
- two connection poles on each of the battery cells and arranged along one side of the battery module in two spaced apart rows;
- a recess extending along the side of the battery module between the rows of connection poles;
- degassing predetermined breaking points provided respectively in the battery cells and arranged in the recess;
- a guide element positioned in the recess and extending along all of the battery cells of the battery module, the guide element defining at least part of a degassing channel communicating with the degassing predetermined breaking points; and
- a common battery module control device configured to control all of the battery cells of the battery module, the battery module control device being arranged in the recess so as not to project beyond the one side of the battery module.

6. The motor vehicle battery of claim 5, further comprising a profile secured to the guide element and configured so that the degassing channel is defined between the profile and the guide element.

7. The motor vehicle battery of claim 6, wherein the profile is between the degassing channel and the battery module control device.

8. The motor vehicle battery of claim 7, wherein the guide element has a base wall and two side walls projecting from opposite sides of the base wall, the base wall being formed with cutouts that provide communication between the degassing predetermined breaking points and the degassing channel.

9. The motor vehicle battery of claim 5, wherein the battery module control device has an outer surface aligned with an outer surface of the battery cells opposite the degassing channel predetermined breaking points of the battery cells are on one side of the battery module and are offset inward in relation to the connection poles of the battery cells to form a recess, and, the guide element defining a degassing channel and an accommodation space for the battery module control device.

* * * * *